United States Patent Office 3,029,264
Patented Apr. 10, 1962

3,029,264
PREPARATION OF A MIXTURE OF FATTY-ACYL-OXYALKANE SULPHONATES
Jan van Alphen, Voorburg, and Johannes Terwan, Vlaardingen, Netherlands, assignors to Lever Brothers Company, New York, N.Y., a corporation of Maine
No Drawing. Filed Apr. 28, 1959, Ser. No. 809,339
Claims priority, application Great Britain Apr. 29, 1958
8 Claims. (Cl. 260—400)

This invention relates to surface-active agents. More particularly, it relates to the preparation of fatty-acyl-oxyalkane sulphonates.

Previously it has been proposed to carry out the preparation of these compounds merely by heating together a fatty acid and a hydroxyalkane sulphonate at temperatures of 220° C. or above, as is described, for example, in British Intelligence Objectives Subcommittee Miscellaneous Report 11, pages 31–2, for the cases where the acid is either oleic acid or a synthetic fatty acid, and the other reactant is an isethionate.

This method suffers from certain disadvantages, namely, the excessive foaming which occurs during part of the reaction and which makes necessary the use of a reaction vessel very large relative to the volume of the reactants, the need for vigorous stirring in order to ensure adequate mixing of the phases of the reaction mixture, and the necessity for reduced pressure to be maintained throughout the reaction. Further, the products normally suffer discoloration.

In our co-pending applications Nos. 734,088/9 filed May 9, 1958, it has been shown that some of the disadvantages of the prior art method may be overcome or appreciably reduced by carrying out the reaction in the presence of strongly acid organic compounds or salts of weak bases and strong inorganic or organic acids. However, in particular with the acid reaction-promoting compounds, discoloration will usually still occur to some extent, particularly if the reaction is pushed to a high degree of conversion, say above 90% calculated on the isethionate used. The high temperature is probably the cause of this discoloration.

It has now been found that discoloration can be prevented or reduced by using a mixture of alkali-metal hydroxyalkane sulphonates which melts below 180° C. and carrying out the reaction at a relatively low temperature.

The present invention provides, therefore, a process for the preparation of a mixture of fatty-acyl-oxyalkane sulphonates of the formula $R.CO.O.R'.SO_3M$, where R is a $C_{9-17}$ alkyl radical, R' is a small divalent hydrocarbon radical or a divalent dialkyl ether radical containing from 2 to 8 carbon atoms, and M is an alkali metal, in which a mixture of salts of the formula $HO.R'.SO_3M$ melting below 180° C. is heated with an acid of the formula R.COOH at a temperature below 200° C. but above the melting point of the mixture of salts.

The term "alkali metal" is to be understood to include ammonium and substituted ammonium radicals.

The mixtures of salts to be used in the process of the invention may have different cations and the same anion, different anions and the same cation, or different anions and different cations. It is generally preferred to use mixed sodium and potassium salts of the same hydroxyalkane sulphonic acid.

In many cases the reaction can be carried out at a temperature below 180° C. It is preferred to use a mixture of sodium and potassium isethionates in about equal amounts by weight; the reaction can then conveniently be carried out at a temperature of about 150° to 160° C.

To obtain high yields, a reaction-promoting compound as defined above should normally be included in the reaction mixture. Strongly organic compounds which can be used as reaction-promoting compounds include, for example, p-toluene sulphonic acid, β-naphthalene sulphonic acid, dodecylbenzene sulphonic acid, dodecane sulphonic acid, isethionic acid, lauroyl-isethionic acid, monododecyl phosphoric acid, monochloroacetic acid, acetyl chloride, lauroyl chloride, and chloroformic acid ethyl ester. Salts of weak bases with strong inorganic or organic acids which can be used as reaction-promoting compounds include, for example, aluminium chloride, aluminium sulphate, alum, aluminium isethionate, aluminium dodecylbenzene sulphonate, aluminium dodecane sulphate, stannous chloride, stannic chloride, zinc chloride, zinc sulphate, zinc isethionate, or hydrazine chloride. In general, 0.01% to 10%, preferably 0.1% to 5%, of the reaction-promoting compound, by weight of the reaction mixture, is added but greater or lesser amounts may be used.

Examples of the acids R.COOH which may be employed are lauric acid, myristic acid, palmitic acid, stearic acid, oleic acid, acids derived from bone grease (mainly $C_{16-18}$ fatty acids), acids derived from palm kernel oil (mainly $C_{12-18}$ fatty acids), acids derived from coconut oil (mainly $C_{12-18}$ fatty acids), and acids derived from tallow (mainly a mixture of saturated and unsaturated $C_{16-18}$ fatty acids). The fatty acids used are preferably free from non-fatty acid materials.

As the compounds of the formula $HO.R'.SO_3M$ (the mixture of which is hereinafter referred to as the second reactant) it is preferred to use compounds in which R' is a divalent hydrocarbon radical of 2–8 carbon atoms, especially an ethylene, propylene or butylene radical. R' may also be a dialkylene ether radical, such as the radical $-CH_2CH_2.O.CH_2CH_2-$. Frequently, it will be convenient to use as the second reactant mixtures of compounds which have been prepared by the reaction of an epoxide, for example, ethylene oxide, propylene oxide, or butylene oxide, with a mixture of sodium and potassium bisulphites. Examples of mixtures suitable for use as second reactants are mixtures of sodium and potassium isethionates, sodium and potassium methylisethionates and sodium potassium dimethylisethionates, and mixtures of sodium isethionate and sodium 2-hydroxypropane-1-sulphonate, provided that the proportions are such that the mixtures melt below 180° C. Mixtures of equal weights of the two components are generally satisfactory. Mixtures of three or more different compounds $$HO.R'.SO_3M$$

having a suitable melting point may also be used.

The reaction may be carried out using equimolecular amounts of the acid and the second reactant, or an excess of the acid, for example 0.1 to 1 mole per mole of the second reactant may be used.

The reaction should be carried out with stirring in order to assist in homogenisation of the reaction mixture, but stirring of much less vigour is necessary in the presence of a reaction-promoting compound as defined above than is the case when such compounds are not present. Mechanical agitation may be unnecessary where a gas such as nitrogen is bubbled through the reaction mixture at a moderate rate, or where the second reactant is added in the form of an aqueous solution. It is essential to remove the water which is formed in the course of the reaction or which may be present if the second reactant is added as an aqueous solution. Reduced pressure may be employed if desired, particularly to remove water during the reaction, but reduced pressure is not an essential feature of the process. A small proportion of the first reactant may distill off with the water, and allowance should be made for this when calculating the amount of first reactant to be used.

The process according to the present invention may be carried out as a batch process, when all the reagents are present initially in the reaction vessel, or it may be modified to form a continuous process by suitable selection of the conditions and of the apparatus. It may be advantageous to employ a high initial concentration of the reaction-promoting compound in the reaction mixture, where such is used, in order to facilitate the course of the reaction. This may be achieved by adding all the reaction-promoting compound to a small proportion, for instance one-tenth, of the reactants, and then gradually adding the remainder of the reactants in approximately proportionate amounts after the reaction has commenced. It has also been found advantageous to add a small amount of the reaction product, for example, 10%, by weight of the reaction mixture, during the initial stage of the reaction.

If desired, any excess of fatty acid in the reaction product may be removed by distillation, preferably with the aid of an entraining agent such as toluene or steam.

The products of reactions according to the invention are especially suitable for the manufacture of detergent tablets. The crude products formed may be either partially or wholly neutralized by the addition of aqueous sodium carbonate or other alkali, such as sodium hydroxide or potassium carbonate, and the crude partially neutralised or wholly neutralised products so formed may then be made directly into detergent compositions, for example, detergent tablets, by conventional methods of manufacture.

The following examples illustrate the invention:

Example 1

300 g. of lauric acid (1.5 moles), 156 g. of a mixture of equal amounts by weight of sodium and potassium isethionates (1 mole) and 4.6 g. of p-toluene sulphonic acid were placed in a flask equipped with a stirrer, thermometer, inert gas inlet and vapour outlet. The temperature was raised to 160° C. and maintained there for 1 hour. Throughout the reaction the vapours from the reaction vessel were led through a condenser. The reaction product contained 87.4% of sodium/potassium lauroylisethionate, calculated on the amount of isethionates used.

Example 2

211 g. of the fatty acids derived from coconut oil, hydrogenated to an iodine value of less than 3 and twice distilled (1 mole), 156 g. of a mixture of equal amounts by weight of sodium and potassium isethionates (1 mole) and 7.6 g. of p-toluene sulphonic acid were heated together to a temperature of 150° to 160° C. under the same conditions as described in Example 1 for 2.5 hours. The reaction product contained 91% of sodium/potassium fatty-acylisethionate, calculated on the amount of isethionates used.

Example 3

200 g. of lauric acid (1 mole), 156 g. of a mixture of equal amounts by weight of sodium and potassium isethionates (1 mole) and 6.1 g. of acetyl chloride were heated together to a temperature of 160° to 170° C. under the same conditions as described in Example 1 for 2 hours. The reaction product contained 73.0% of sodium/potassium lauroyl-isethionate, calculated on the amount of isethionates used.

Example 4

The same reaction as described in Example 3 was carried out using 4.8 g. of $SnCl_4 \cdot 5H_2O$ instead of acetyl chloride. The reaction product contained 47% of sodium/potassium lauroyl-isethionate, calculated on the amount of isethionates used.

Example 5

200 g. of lauric acid (1 mole), 144.5 g. (1 mole) of a mixture of 3 parts by weight of the sodium salt and 7 parts by weight of the ammonium salt of isethionic acid and 3.5 g. of p-toluene sulphonic acid were heated together to a temperature of 120° to 125° C. under the same conditions as described in Example 1 for 5¼ hours. The reaction product contained 77% of sodium/ammonium lauroyl-isethionate, calculated on the amount of isethionates used.

Example 6

200 g. of lauric acid (1 mole), 155 g. (1 mole) of a mixture of equal parts by weight of sodium isethionate and sodium 2-hydroxypropane -1- sulphonate and 3.5 g. of p-toluene sulphonic acid were heated together to a temperature of 170° to 175° C. under the same conditions as described in Example 1 for 3½ hours. The reaction product contained 57% of mixed sodium lauroyloxysulphonates calculated on the amount of mixed hydroxysulphonates used.

Example 7

200 g. of lauric acid (1 mole), 170 g. (1 mole) of a mixture of equal parts by weight of sodium and potassium 3-hydroxypropane-1-sulphonates and 3.8 g. of p-toluene sulphonic acid were heated together to a temperature of 150° to 160° C. under the same conditions as described in Example 1 for 3 hours. The reaction product contained 34% of sodium/potassium 3-lauroyloxypropane-1-sulphonate, calculated on the amount of hydroxypropane sulphonates used.

Example 8

200 g. (1 mole) of lauric acid, 156 g. (1 mole) of equal amounts by weight of sodium and potassium isethionates and 3.5 g. of aluminum sulphate, $Al_2(SO_4)_3 \cdot 18H_2O$, were heated together to a temperature of 190–195° C. under the same conditions as described in Example 1 for 4 hours. The reaction product contained 87% of sodium/potassium lauroyl-isethionate, calculated on the amount of isethionates used.

Example 9

200 g. (1 mole) of lauric acid, 156 g. (1 mole) of equal amounts by weight of sodium and potassium isethionates and 3.5 g. of phosphoric acid (as a 89% aqueous solution) were treated together to a temperature of 190–195° C. under the same conditions as described in Example 1 for 4 hours. The reaction product contained 86% of sodium/potassium lauroyl-isethionate, calculated on the amount of isethionates used.

We claim:

1. A process for the preparation of a mixture of fatty-acyloxyalkane sulphonates of the formula $$R.CO.O.R'.SO_3M$$

where R is a $C_{9-17}$ alkyl radical, R' is a radical selected from the group consisting of divalent alkyl radicals and divalent dialkyl ether radicals containing from 2 to 8 carbon atoms and M is an alkali-metal, in which a mixture of salts of the formula $HO.R'.SO_3M$ which melts below 180° C. is heated with an acid of the formula $R.COOH$ at a temperature below 200° C. but above the melting point of the mixture of salts.

2. A process according to claim 1 which is carried out in the presence of a reaction-promoting compound selected from the group consisting of p-toluene sulfonic acid, B-napthalene sulfonic acid, dodecylbenzene sulfonic acid, dodecane sulfonic acid, isethionic acid, lauroylisethionic acid, monododecyl phosphoric acid, monochloroacetic acid, acetyl chloride, lauroyl chloride, chloroformic acid ethyl ester, aluminum chloride, aluminum sulphate, alum, aluminum isethionate, aluminum dodecylbenzene sulfonate, aluminum dodecane sulfate, stannous chloride, stannic chloride, zinc chloride, zinc sulfate, zinc isethionate and hydrazine chloride.

3. A process for the preparation of a mixture of fatty-acyloxyalkane sulphonates of the formula $$R.CO.O.R'.SO_3M$$

where R is a $C_{9-17}$ alkyl radical, R' is a $C_{2-4}$ divalent alkyl radical, and M is an alkali-metal, in which a mixture of salts of the formula $HO.R'.SO_3M$ which melts below 180° C. is heated with an acid of the formula R.COOH at a temperature below 200° C. but above the melting point of the mixture of salts.

4. A process for the preparation of a mixture of fatty-acyloxypropane sulphonates of the formula $$R.CO.O.C_3H_7.SO_3M$$

where R is a $C_{9-17}$ alkyl radical and M is an alkali-metal, in which a mixture of alkali-metal hydroxypropane sulphonates which melts below 180° C. is heated with an acid of the formula R.COOH at a temperature below 200° C. but above the melting point of the mixture of hydroxypropane sulphonates.

5. A process for the preparation of a mixture of fatty-acylisethionates of the formula $R.CO.O.C_2H_4.SO_3M$, where R is a $C_{9-17}$ alkyl radical and M is an alkali-metal, in which a mixture of alkali-metal isethionates which melts below 180° C. is heated with an acid of the formula R.COOH at a temperature below 200° C. but above the melting point of the mixture of isethionates.

6. A process for the preparation of a mixture of sodium and potassium fatty-acyl-isethionates the fatty acyl group of which has from 10 to 18 carbon atoms, in which a mixture of sodium and potassium isethionates which melts below 180° C. is heated with a $C_{10-18}$ fatty acid at a temperature below 200° C. but above the melting point of the mixture of isethionates.

7. A process according to claim 6 which is carried out in the presence of a reaction-promoting compound selected from the group consisting of p-toluene sulfonic acid, B-napthalene sulfonic acid, dodecylbenzene sulfonic acid, dodecane sulfonic acid, isethionic acid, lauroylisethionic acid, monododecyl phosphoric acid, monochloroacetic acid, acetyl chloride, lauroyl chloride, chloroformic acid ethyl ester, aluminum chloride, aluminum sulphate, alum, aluminum isethionate, aluminum dodecylbenzene sulfonate, aluminum dodecane sulfate, stannous chloride, stannic chloride, zinc chloride, zinc sulfate, zinc isethionate and hydrazine chloride.

8. A process for the preparation of a mixture of sodium and potassium fatty-acyl-isethionates, the fatty acyl group of which has from 10 to 18 carbon atoms, in which a mixture of equal parts by weight of sodium and potassium isethionates is heated with from 1 to 2 molecular proportions of a $C_{10-18}$ fatty acid at 150–160° C. in the presence of a reaction-promoting amount of p-toluene sulphonic acid.

References Cited in the file of this patent

UNITED STATES PATENTS

| | | |
|---|---|---|
| 1,881,172 | Daimler et al. | Oct. 4, 1932 |
| 2,584,701 | Henry | Feb. 5, 1952 |
| 2,759,953 | Knight et al. | Aug. 21, 1956 |
| 2,806,044 | Weil et al. | Sept. 10, 1957 |

OTHER REFERENCES

Weil et al.: II, J. Am. Oil Chemists Soc., 32, (6) 370–372, 1955.